(12) United States Patent
Smith

(10) Patent No.: US 9,766,262 B2
(45) Date of Patent: Sep. 19, 2017

(54) SYSTEM AND METHOD FOR MEASURING DOPPLER EFFECT UTILIZING ELASTIC AND INELASTIC LIGHT SCATTERING

(71) Applicant: RAYTHEON COMPANY, Waltham, MA (US)

(72) Inventor: Duane D. Smith, Rancho Palos Verdes, CA (US)

(73) Assignee: RAYTHEON COMPANY, Waltham, MA (US)

( * ) Notice: Subject to any disclaimer, the term of this patent is extended or adjusted under 35 U.S.C. 154(b) by 429 days.

(21) Appl. No.: 14/537,683

(22) Filed: Nov. 10, 2014

(65) Prior Publication Data

US 2016/0131676 A1    May 12, 2016

(51) Int. Cl.
| | |
|---|---|
| *G01P 5/26* | (2006.01) |
| *G01S 17/58* | (2006.01) |
| *G01S 17/95* | (2006.01) |

(52) U.S. Cl.
CPC ............... *G01P 5/26* (2013.01); *G01S 17/58* (2013.01); *G01S 17/95* (2013.01)

(58) Field of Classification Search
CPC ....... G01N 21/65; G01S 7/4802; G01S 7/499; G01S 17/58; G01S 17/95
USPC .................................................. 356/28–28.5
See application file for complete search history.

(56) References Cited

U.S. PATENT DOCUMENTS

| | | | |
|---|---|---|---|
| 8,077,294 B1* | 12/2011 | Grund | G01N 21/65 356/3.01 |
| 9,007,570 B1* | 4/2015 | Beyon | G01S 17/95 356/28 |
| 2007/0171396 A1 | 7/2007 | Harris et al. | |
| 2011/0285984 A1* | 11/2011 | Christian | G01P 5/26 356/28.5 |

FOREIGN PATENT DOCUMENTS

FR    2 922 314    4/2009

OTHER PUBLICATIONS

Written Opinion of the International Searching Authority for International Application No. PCT/US2015/048554 filed Sep. 15, 2015, Written Opinion of the International Searching Authority mailed Nov. 19, 2015 (7 pgs.)
International Search Report for International Application No. PCT/US2015/048554, filed Sep. 15, 2015, International Search Report dated Nov. 13, 2015 and mailed Nov. 19, 2015 (4 pgs.)

* cited by examiner

*Primary Examiner* — Luke Ratcliffe
(74) *Attorney, Agent, or Firm* — Lewis Roca Rothgerber Christie LLP

(57) ABSTRACT

Method and apparatus for measuring a Doppler effect of a scattered light include: projecting an ultra violet (UV) light towards a target by a light emitter; receiving the UV light scatter from the target from the emitted UV light reflected from the target by a light receiver; measuring the frequency shift of the UV light scatter with respect to the emitted UV light to obtain distribution of line of sight velocity of macroscopic matters of the target corresponds to a Doppler (Continued)

shift; processing the distribution of the line of sight velocity to determine the Doppler effect of the UV light scatter; and separating the wind line of sight velocity as the centroid shift of the microscopic Doppler shift probability distribution.

14 Claims, 3 Drawing Sheets

SYSTEM AND METHOD FOR MEASURING DOPPLER EFFECT UTILIZING ELASTIC AND INELASTIC LIGHT SCATTERING

FIELD OF THE INVENTION

The present invention relates to optical measurement systems and more specifically to a system and method for measuring Doppler effect of scattering light.

BACKGROUND

Doppler effect of a wave is defined as the change in frequency of the wave from an observer side that is moving relative to the source of the wave. For Doppler effect, the frequency of the received (reflected) wave is higher during the approach, identical at the instant of passing by, and lower as the source move away from the observer (receiver), relative to the frequency of the emitted wave. In other words, each successive wave peak is emitted from a position closer to the observer than the previous wave, when the source of the waves is moving toward the observer. As a result, each wave takes slightly less time to reach the observer than the previous wave and thus the time between the arrival of successive wave peaks at the observer is reduced, causing an increase in the frequency. While the waves are travelling, the distance between successive wave fronts is reduced causing the waves to bunch together. On the other hand, each wave is emitted from a position farther from the observer than the previous wave, so the arrival time between successive waves is increased, reducing the frequency, when the source of waves is moving away from the observer. The distance between successive wave fronts is increased, so the waves spread out.

Doppler effect is utilized in a variety of different application, for example, measuring fluid flows, temperature, vibration and velocity, by a Lidar or laser.

An inelastic scattering of light (photons) is when photons are scattered from an atom or molecule, causing most photons to elastically scatter (Rayleigh scattering), such that the scattered photons have the same frequency and wavelength as the incident photons. A dynamic or quasi-elastic scattering of light (photons) is a scheme that can be used to determine the size distribution profile of small particles in suspension or polymers in solutions and to examine the behavior of complex fluids such as concentrated polymer solutions.

When light hits small particles, the light scatters in all directions (Rayleigh scattering) as long as the particles are small compared to the wavelength of the light. If the light source is a laser (monochromatic and coherent), then a time-dependent fluctuation in the scattering intensity can be observed. This fluctuation is due to the fact that the small molecules in solutions are undergoing Brownian motion, and so the distance between the scatterers in the solution is constantly changing with time. This scattered light then undergoes constructive or destructive interference by the surrounding particles, and within this intensity fluctuation, information is contained about the time scale of movement of the scatterers.

For measuring the wind velocity, atmospheric aerosol and molecular back-scattering is used. However, conventional edge detection and spectral binning wind lidar systems use low finesse etalons to measure Doppler frequency shifts and extract the wind velocity. However, existing approaches are too slow and have too low a velocity precision to meet some higher speed and accuracy of some applications, because they are also photon-inefficient.

Doppler shifted off-resonance light scattering from fluids (condensed phase and gas) is important to characterizing flow dynamics in many applications. However, for fluid flows without particles in them (hydrosols, aerosols) conventional quasi-elastic light scattering measurements have low signal to noise ratio (SNR).

SUMMARY

The system and method of the present invention increases the SNR by adding Doppler-resolved inelastic light scattering from other fluid constituent degrees of freedom, such as atomic/molecular electronic states, and molecular rotations/vibrations. In addition to enhanced SNR, some other advantages of some embodiments of the system and method of the present invention include, measurement of non-equilibrium energy transfer amongst the degrees of freedom, temporally and spatially resolved density, velocity and temperature maps, multi-species combustion dynamics, and the like.

In some embodiments, the present invention is a method for measuring a Doppler effect of a scattered light. The method includes: projecting an ultra violet (UV) light towards a target by a light emitter; receiving the UV light scatter from the target from the emitted UV light reflected from the target by a light receiver; measuring the frequency shift of the UV light scatter with respect to the emitted UV light to obtain distribution of line of sight velocity of macroscopic matters of the target corresponds to a Doppler shift; processing the distribution of the line of sight velocity to determine the Doppler effect of the UV light scatter; and separating the wind line of sight velocity as the centroid shift of the microscopic Doppler shift probability distribution.

In some embodiments, the present invention is an apparatus for measuring a Doppler effect of a scattered light. The apparatus includes a light emitter for emitting an ultra violet (UV) light towards a target; a light receiver for receiving an UV light scatter from the target from the emitted UV light reflected from the target, via and antenna; an optical frequency shifter for generating wavelength shifted coherent replicas of the local oscillator that match optical frequency shifts due to molecular rotations, vibrations or similarly wavelength shifted inelastic scattering; an optical-to-electrical photodetector conversion circuit for converting the received UV light scatter to an electrical signal; a processor for measuring the frequency shift of the electrical signal with respect to the emitted UV light to obtain distribution of line of sight velocity of macroscopic matters of the target corresponding to a Doppler shift, for processing the distribution of the line of sight velocity to determine the Doppler effect of the UV light scatter, and for separating the wind line of sight velocity as the centroid shift of the microscopic Doppler shift probability distribution.

The macroscopic matters of the target may be one or more of atoms, molecules and particles of the target. The Doppler shifting of the center of the distribution of the line of sight velocity provides an overall flow/wind velocity information and a width of a broader distribution is determined by a velocity of the individual macroscopic matters in the target flow information.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Figure 1:
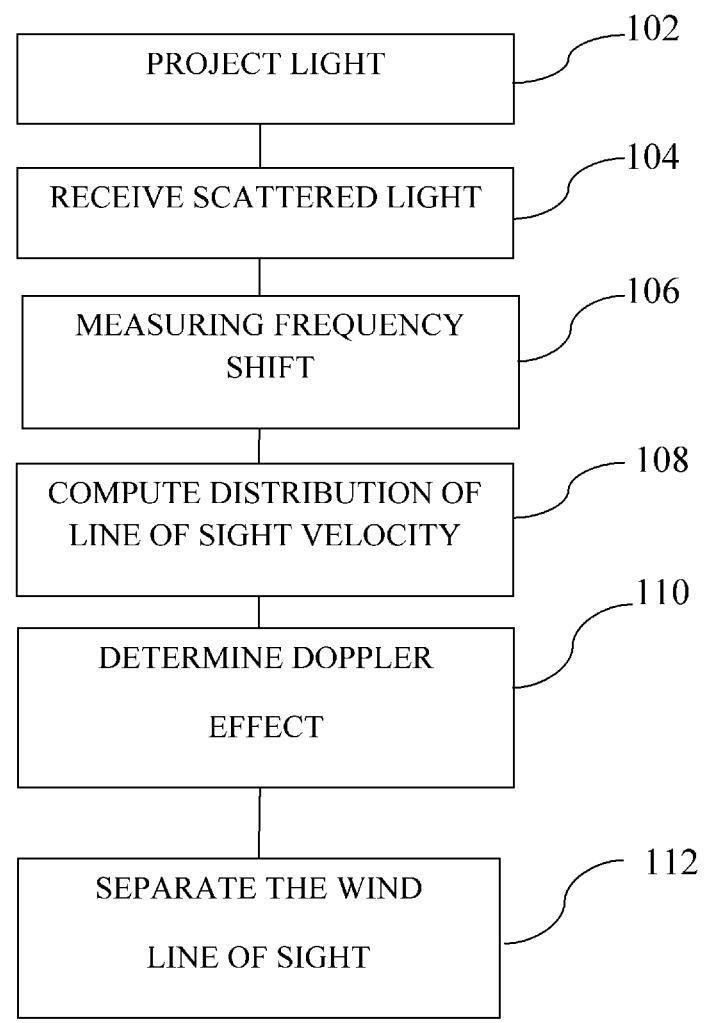
FIG. 1 shows an exemplary process flow for measuring a Doppler effect of a scattered coherent light, according to some embodiments of the present invention.

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention is a method and system for measuring a Doppler effect of a scattered coherent laser light. The invention's light scattering analysis system and method produce a narrow spectral linewidth local oscillator (not necessarily an absolute frequency or exceptionally stable frequency) reference that is amplified and scattered from a probe volume within the fluid. Also, a precise offset wavelength-shifted coherent copy of the reference can be generated. That offset coherent copy can be chosen to match, the frequency shift from the internal degrees of freedom (electronic, vibrational and rotational) of the atoms and molecules in the fluid for the given viewing geometry (backscattering, side scattering and forward hemispheres are commonly chosen). Then, heterodyne or interferometric direct detection of the inelastic scattered light using the offset coherent replicas provides the mechanism to measure Doppler spectrum of the flow from inelastic light scattering from these internal degrees of freedom. In some embodiments, autodyne or homodyne, an optical mixing at a square low photodetector may be used instead of a heterodyne.

That is, a wavelength offsets is generated for the inelastic scattered light and detected, with selectable time and frequency resolution to best be suited to the available heterodyne detection bandwidth. For example, the translational Doppler spectrum width for atmospheric gas molecules is typically 3 GHz at the full width at half maximum, so a heterodyne detection bandwidth of 6 GHz to get more of the tails of the velocity distribution and therefore a more accurate centroid measurement.

The reference wavelength offset spacing is accurate, and have a low drift rate, set by the measurement scenario. For example, to coherently measure atmospheric $N_2$ molecular vibrational Raman shift backscattering, a moderately long (10's of meters) hollow single mode fiber could be filed with N2 and the UV local oscillator could be injected to create stimulated Raman scattering at the selected rotational-vibrational transition and then used as a local oscillator to probe just that transition. That could be useful for providing backscattered signals at multiple wavelengths enabling improved radiometric backscatter measurements and Doppler measurements at the Raman line In some embodiments, ultraviolet light is used to increase the amount of Rayleigh scattered light from the microscopic matters, such as atoms, molecules and/or particles, in the fluid. The scattering cross-section generally scales as $1/\lambda^4$ when means that larger signals can be obtained with shorter wavelengths. The choice of wavelength may depend on many factors, for example, wavelengths might be chosen to minimize the fluorescence emission but still have reasonable Rayleigh scattering. The resonance fluorescence can be very spectrally broad and intense therefore masking the translational Doppler broadening that is sought. This way, the invention is capable of accurately measuring the atmospheric range-resolved Doppler wind velocity in the absence of aerosols.

FIG. 1 shows an exemplary process flow for measuring a Doppler effect of a scattered coherent light, according to some embodiments of the present invention. As shown in block 102, an ultra violet (UV) light is projected towards a target, from an emitter. The Rayleigh scattered light has a spectral linewidth that is essentially set by the incident laser spectral width. This so-called virtual state scattering means that a laser pulse width can be selected that jointly provides high enough intensity to make the signal-to-noise ratio (SNR) practical, provides the spatial range resolution desired for the problem at hand, and allows retrieval of the Doppler spectrum.

For example, a femtosecond pulse that is 100's of nm wide would not be desirable for atmospheric gases around 300K because the laser spectral width would be much broader than the Doppler broadening and make retrieval of the flow velocity and translational energy distribution of the gas difficult, if not impossible with practical SNRs. In the embodiments in which, the present invention is directed to only a receiver (not both transmitter and receiver), block 102 is not present and the emission of the UV light is performed by a emitter/transmitter.

In block 104, the emitted light scattered from the target is received, for example by a light receiver such as an optical telescope, or the like. The received (scattered) light is then optically processed (& possibly filtered) and then converted to an electrical signal. In block 106, the frequency shift of the electrical signal with respect to the emitted light is measured to obtain distribution of line of sight velocity of microscopic matters, such as atoms, molecules and/or particles, of the target, for example at 355 nm, 1 m/s corresponds to a Doppler shift of 5.6 MHz. Accordingly, a gas molecule moving at 300 m/s (approximately the speed of sound in air at sea level) corresponds to (300 m/s)(5.6 MHz)=1.68 GHz frequency shift.

In some embodiments, the optical frequency is shifted and thus the electrical signal from the heterodyne mixing necessarily exhibit same frequency shift. This is a well-known process of optical heterodyne wave mixing where the scattered light and a frequency shifted copy of the incident light are mixed on an interferometer at a detector to measure the frequency shift.

In block 108, the obtained distribution of the line of sight velocity is processed to obtain the Doppler effect. The Doppler effect ends up producing a Doppler spectrum. The Doppler spectrum is the collection of all the different frequency shifts caused by all the different velocities of targets. In the case of the molecules in the atmosphere, some are moving towards the sensor, some are moving away from the sensor and the result is a fairly wide collection (i.e. a spectrum) of frequency shifts rather than a single frequency shift like that of an airplane. The measured Doppler spectrum can be quite complex and is achieved by performing a digital Fourier transform on the heterodyne beat notes that the receiver provides. For example, in atmospheric scattering, there are Doppler shifts due to the thermally-drive translation of the gaseous constituents. Also, there are other Doppler shifts due to Brillouin scattering, which are directionally dependent), and superimposed macroscopic wind that adds a Doppler shift to all of the microscopic Doppler shifts.

In block 110, the wind line of sight velocity is separated as the centroid shift of the microscopic Doppler shift probability distribution. There are a variety of algorithms that can be used to calculate the centroid shift from the measured frequency shifted Doppler spectrum. One starting point may be to assume that the Doppler shift spectrum is symmetric, even though there may be wings, such as Brillouin sidebands, and non-Gaussian shapes. In the case of velocity distributions being symmetric about some mean value, centroid shift retrieval algorithms include, but are not limited to, least squares fits, methods of moments, and maximum likelihood estimators. The centroid shift retrieval algorithms calculates the error uncertainty in the mean Doppler shift so that the wind velocity error can be calculated. However, there are situations where the velocity distributions may not appear to be symmetric even though they are in fact symmetric. For example, wind gusts, and variations in wind direction over a measurement dwell time may look like fitting errors an asymmetry, but they are neither, leading to a range of skew shapes and magnitudes. In that case, the fluctuations (not errors) in the centroid reflect the local fluctuations in the wind speed and direction, and not the measurement errors. Adjusting the measurement dwell time to be faster than the wind speed changes resolves whether or not this is the case.

The accumulation of a large number of photons provides increasing accuracy and fidelity of the spectrum of the beat notes which is directly related to the Doppler shift spectrum. When the SNR is large enough, or equivalently, when there are enough scattered laser photons to measure the centroid shift of all of the microscopic Doppler shifts, the LOS wind velocity can be determined. The precision of the wind velocity measurement depends upon how well the centroid shift of all the microscopic scattering (translation, vibration, rotation) can be fit.

Heterodyning or frequency conversion can be used to measure frequencies of electromagnetic signals that are typically difficult to measure by typical frequency counters. In some cases, a reference signal of a known frequency near the unknown frequency is mixed with the unknown frequency in a nonlinear mixing device such as a diode, for example, in a light receiver. This creates a heterodyne or "beat" signal at the difference between the two frequencies. If the two signals are close together in frequency, then the beat is low enough to be measured by a frequency counter. To reach higher frequencies, several stages of heterodyning may be used and combined together.

Figure 3:
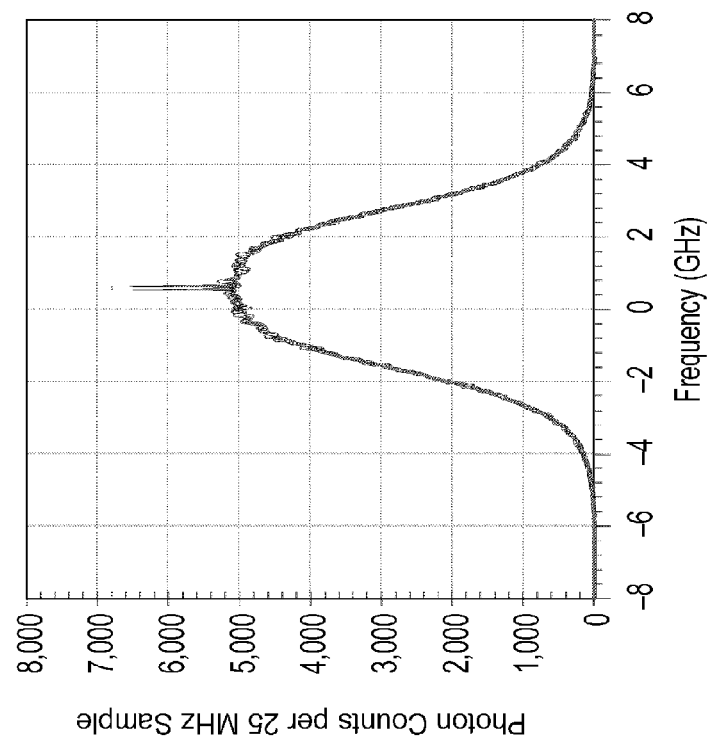
FIGS. 3A and 3B illustrate signal simulations, according to some embodiments of the present invention.
Figure 3B:
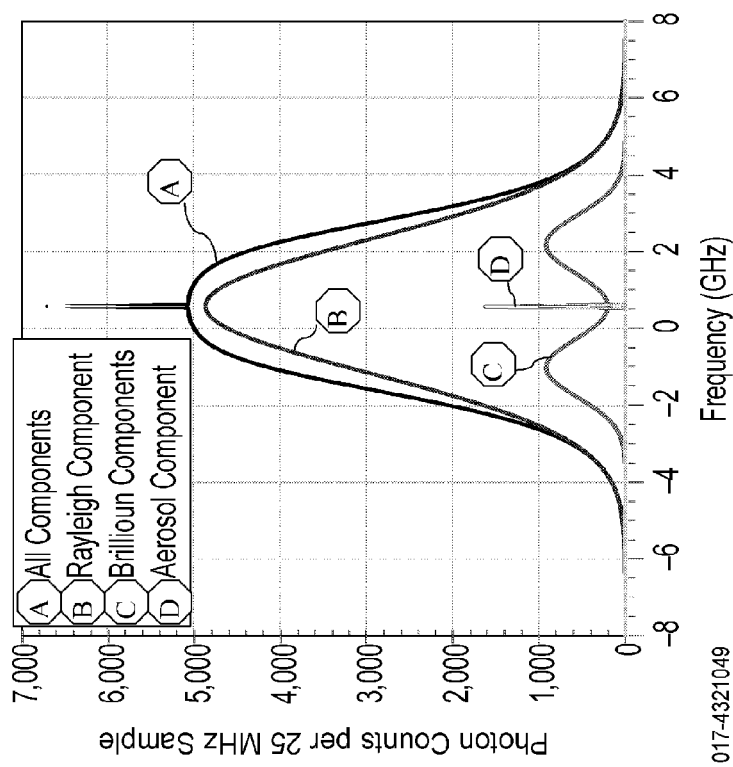

FIGS. 3A and 3B illustrate signal simulations, according to some embodiments of the present invention. As shown, multiple scattering processes lead to different Doppler shifts and line broadening mechanisms that the present invention can directly and unambiguously measure. FIG. 3A shows the contributions of aerosols, Rayleigh and Brillouin scattering to the overall non-Gaussian lineshape. FIG. 3B shows Monte Carlo simulation of a coherent heterodyne transceiver operating with 25 MHz resolution and a total of $10^6$ photoelectrons detected. The line shape model is from Witschas, Appl. Opt., Vol. 50, No. 3, pp. 267-280 (2011), the entire contents of which is hereby incorporated by reference.

The Doppler shift of the center of the distribution gives the overall flow/wind velocity and the width of the broader microscopic Doppler shift distribution due to translation and acoustic modes (Brillouin scattering) is determined by the velocity of the individual molecules in the net flow whereas the width of the spike is determined by the aerosols in the flow having velocity fluctuations due to local velocity fluctuations due to imperfect entrainment in the molecular flow. Non-Gaussian Rayleigh-Brillouin line shapes are a function of temperature and pressure. Competing methods with low resolution Doppler spectrum retrieval compromises the accuracy of the wind velocity retrieval and the temperature measurements, which discards or distorts the information provided by the composite line shape function.

The wavelength offsets can be due to the different molecular velocity groups moving at different wind speeds. If information on the different contributors to the spectral lineshape is not desired, adaptive signal processing can reduce the spectral resolution of the Fourier transform to focus on better statistical accuracy of movement of the centroid of the profile, which is solely due to the wind velocity moving a parcel of air along the line of sight of the lidar transceiver.

As an example of adaptive signal processing, consider the need to acquire approximate wind speed in less time over a larger survey volume. One approach may be fewer frequency bins applied to the Doppler shift estimation algorithm If five spectral bins that are 500 MHz wide on each side of zero velocity are chosen to recover wind and temperature (for example, from the width of the Doppler distribution) the result would be a lower precision than if 10 bins were chosen on each side of zero velocity. The choice of the number and width of the spectral shift bins, which can be adaptively and dynamically changed (for example, by a processor) depends partly on the number of photons required for each bin and the precision that is required to declare the wind and temperature. For example, if 1,000 photons were accumulated in most populous of the 500 MHz wide bins, the average error in declaring that intensity is approximately sqrt (1000)~31 and the intensity error in a bin with only 100 photons would be ~10. Subsequently, fitting those Doppler distributions to a temperature would have more error than if there were a million photons in the larger bins.

For example, when the Fourier Transforms of the temporal heterodyne beat notes are performed, the window function could be set anywhere from the inverse of the laser pulse width (say 4.4 MHz for a 100 n sec long spectral transform limited laser pulse) to the highest bandwidth beat note that the receiver is capable of detecting, say 10 GHz instantaneous bandwidth. Setting the detection bandwidth adaptively will allow the user to decide how to apportion the backscattered light. An extreme example is the so-called "double edge" detection where the backscattered light is split into two bins, one for all the light to the red of the outgoing laser and the rest to the blue of the outgoing laser. Taking the ratio of the total photoelectron counts in the red and blue sides of the laser can be used to determine the wind velocity Doppler shift.

In some embodiments, the invention uses non-resonant elastic & inelastic scattering from atomic/molecular degrees of freedom.

Figure 2:
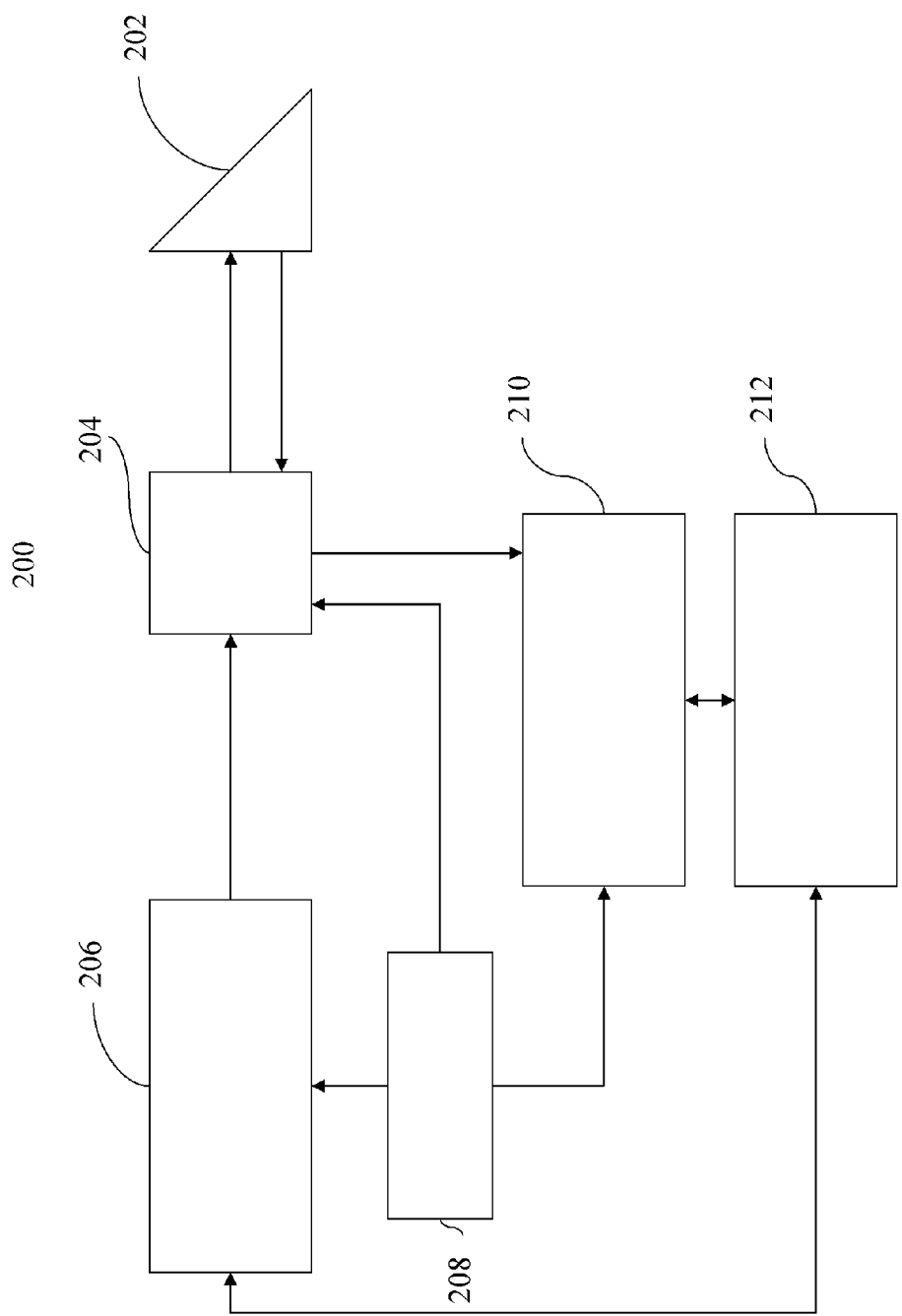
FIG. 2 is an exemplary simplified block diagram of an optical transceiver, according to some embodiments of the present invention.

FIG. 2 is an exemplary block diagram of an optical transceiver 200, according to some embodiments of the present invention. As shown, the scattered coherent light is received by the antenna 202 and fed to a filtering and alignment circuit (module) 204. The antenna includes the transmit and receive optics and may be gimbaled. The alignment circuit (module) 204 may include a transmit/receive telescope, alignment optics, polarization optics, optical filters and other appropriate optics know to skilled artisans. The filtered received light is then provided to a receiver 210, which includes optical-to-electrical conversion circuitry for converting the received optical signals to electrical signals to be processed by a processor 212.

The idea here is to fix the volume in the gas probed by the laser and change the view angle to look for vector wind velocities and anisotropic temperatures by looking at molecules (particles, or atoms) only along certain measurement directions. This can be useful in diagnostics for jets, scramjets, hypersonic flow, explosions and other non-equilibrium systems to understand the energy transfer.

The processor 212 adaptively processes the electrical signals to compute distribution of the line of sight velocity and then to process it to obtain the Doppler effect, as described above. Although processor 212 is depicted by a single block, one skilled in the art would recognize that the block include a processing unit, associated storage and input/output circuitry, network interface, user interface and other typical circuitry to make the processor 212 functional for the purposes of the present invention.

On the transmitting side, the signals from the processor 212 are provided to the transmitter 206, which include a laser, for example, a 355 nm wavelength laser. In some embodiments, the laser may be 266 nm wavelength lasers such as the fourth harmonic of Nd:YAG laser, 308 nm XeCl excimer lasers or a wide variety of other sources, as long as they are spectral transform limited where $\delta\tau\delta\nu=0.441$ for Gaussian spectral transform-limited pulses at the FWHM. The optical (laser) signal is then filtered and aligned by the filtering and alignment circuit (module) 204, before it is fed to the antenna 202 for transmission towards a target. A timing circuitry 208 provides the appropriated clocks and timing signals to the various components of the optical transceiver 200. The timing circuitry 208 may include an optical frequency shifter to provide wavelength shifted coherent replicas of the local oscillator that match optical frequency shifts due to molecular rotations, vibrations or similarly large (>100 GHz) wavelength shifted inelastic scattering.

For example, if the objective is to measure the rotational temperature, as opposed to the translational temperature (to determine if there is an equilibrium or non-equilibrium gas) of the rotational states of N2 nitrogen molecules, then the local oscillator that was used to generate the outgoing UV pulse can be frequency shifted by the rotational Raman shifts. Nitrogen's rotation Raman spectrum consists of a series of lines separated by ~8 $cm^{-1}$ or equivalently 240 GHz. Achieving such a large frequency shift by electro-optical phase or amplitude modulation is impractical with current technology but can be achieved in a hollow core fiber that is filled with nitrogen gas by putting the UV light from the LO through the fiber and spectrally selecting the rotational Raman shifted line of interest, with a interferometer or fiber Bragg grating filter to select a particular rotational Raman line. One example of where this process is useful is on hypersonic vehicles to measure the true airspeed, which requires finding the centroid of the Doppler shift direction along the flight vector and then looking at the wind speed perpendicular to flight due to the flow being pushed sideways. This is a highly non-equilibrium flow condition, especially across the boundary layer shock interface. The present invention can probe the flow field from the vehicle's surface out to the free flow zone by looking at the differences between the translational and rotation temperatures.

The timing circuitry 208 may also include a frequency monitor circuit for monitoring the frequencies of the amplified outgoing laser pulse compared to the master oscillator carrier frequency. This is done because the amplifier cannot perfectly follow the injected laser light frequency and a record of that injection-output error allows for compensation of the offset and therefore improved velocity accuracy. Although, FIG. 2 depicts the frequency monitor circuit and the optical frequency shifter as part of the timing circuitry 208, in some embodiments, the frequency monitor circuit and/or the optical frequency shifter may be separate from the timing circuitry 208.

As explained above, some embodiments of the present invention is directed to the receiving side, including the processor 212 and do not include a transmitter. In some embodiments, the receiver according to the present invention is a coherent double balanced heterodyne receiver (CDBR) that uses asymmetric arm Mach-Zehnder intferometers (MZI) for order sorting and blue/red Doppler disambiguation. The heterodyne CDBR and the MZI extend the temporal detection bandwidth by more than four times compared to conventional single detector heterodyne receivers.

Notably the injection seeder that drives the pulsed transmitter shares a common master oscillator operating at 1064 nm wavelength. The local oscillator is produced with a frequency tripler, such as a waveguide periodically poled lithium tantalate quasi-phase-matched crystal, or any other type of frequency tripler that is appropriate for low power continuous wave frequency tripling.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for measuring a Doppler effect of a scattered light, the method comprising:
    projecting an ultra violet (UV) light towards a target by a light emitter;
    receiving an UV light scatter from the emitted UV light reflected from the target, by a light receiver;
    measuring the frequency shift of the UV light scatter with respect to the emitted UV light to obtain distribution of line of sight velocity of macroscopic matters of the target that corresponds to a Doppler shift;
    processing the distribution of the line of sight velocity to determine the Doppler effect of the UV light scatter;
    separating the wind line of sight velocity as the centroid shift of the microscopic Doppler shift probability distribution; and
    adaptively changing a number and a width of spectral shift frequency bins according to a number of photons required for each bin and a predetermined required precision.

2. The method of claim 1, wherein processing the distribution of the line of sight velocity to determine the Doppler effect comprises performing a digital Fourier transform on a plurality of heterodyne, autodyne or homodyne beat notes provided by the light receiver.

3. The method of claim 1, further comprising optically processing, filtering and converting the received UV light scatter to an electrical signal.

4. The method of claim 1, wherein a Doppler shift of a center of the distribution of the line of sight velocity provides an overall flow/wind velocity information and a width of a broader distribution is determined by a velocity of the individual macroscopic matters in target flow information.

5. The method of claim 1, wherein the macroscopic matters of the target are one or more of atoms, molecules and particles of the target.

6. The method of claim 1, further comprising adaptively changing a number and a width of spectral shift frequency bins.

7. The method of claim 1, further comprising adaptively setting a detection bandwidth to apportion backscattered lights.

8. A apparatus for measuring a Doppler effect of a scattered light comprising:
   a light emitter for emitting an ultra violet (UV) light towards a target;
   a light receiver for receiving an UV light scatter from the emitted UV light reflected from the target, via an antenna;
   an optical frequency shifter for generating wavelength shifted coherent replicas of the local oscillator that match optical frequency shifts due to molecular rotations, vibrations or similarly wavelength shifted inelastic scattering;
   an optical-to-electrical photodetector conversion circuit for converting the received UV light scatter to an electrical signal;
   a processor for measuring a frequency shift of the electrical signal with respect to the emitted UV light to obtain distribution of line of sight velocity of macroscopic matters of the target corresponding to a Doppler shift, for processing the distribution of the line of sight velocity to determine the Doppler effect of the UV light scatter, and for separating the wind line of sight velocity as the centroid shift of the microscopic Doppler shift probability distribution, wherein the processor adaptively changes a number and a width of spectral shift frequency bins according to a number of photons required for each bin and a predetermined required precision.

9. The apparatus of claim 8, wherein the processor performs a digital Fourier transform on a plurality of heterodyne, autodyne or homodyne beat notes provided by the light receiver to process the distribution of the line of sight velocity to determine the Doppler effect comprises.

10. The apparatus of claim 8, further comprising a filtering and alignment device for optically processing and spectrally filtering the received UV light scattered and collected.

11. The apparatus of claim 8, wherein the macroscopic matters of the target are one or more of atoms, molecules and particles of the target.

12. The apparatus of claim 8, wherein the processor adaptively changes a number and a width of spectral shift frequency bins.

13. The apparatus of claim 8, wherein the processor adaptively sets a detection bandwidth to apportion backscattered lights.

14. The apparatus of claim 8, wherein processing the distribution of the line of sight velocity to determine the Doppler effect comprises performing a digital Fourier transform on a plurality of heterodyne, autodyne or homodyne beat notes provided by the light receiver.

* * * * *